United States Patent
Satoh et al.

(10) Patent No.: US 6,859,720 B2
(45) Date of Patent: Feb. 22, 2005

(54) TRAFFIC-INFORMATION DISTRIBUTION METHOD ON-VEHICLE NAVIGATION APPARATUS

(75) Inventors: Hiroyuki Satoh, Tokyo (JP); Kazuo Nakamura, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 10/390,351

(22) Filed: Mar. 17, 2003

(65) Prior Publication Data

US 2003/0236613 A1 Dec. 25, 2003

(30) Foreign Application Priority Data

Mar. 26, 2002 (JP) ........................................ 2002-085637

(51) Int. Cl.[7] ................................................ G06G 7/76
(52) U.S. Cl. ...................................... 701/117; 701/200
(58) Field of Search ................ 701/117–119, 200–202, 701/204, 207–211, 213, 214; 342/357.09, 357.1, 357.12, 357.13; 340/988, 990, 991, 994

(56) References Cited

U.S. PATENT DOCUMENTS

| | | | |
|---|---|---|---|
| 6,317,684 B1 * | 11/2001 | Roeseler et al. | ............ 701/202 |
| 6,438,490 B2 | 8/2002 | Ohta | |
| 6,466,869 B2 | 10/2002 | Yamashita et al. | |
| 6,574,556 B2 * | 6/2003 | Fish et al. | .................. 701/213 |

* cited by examiner

*Primary Examiner*—Yonel Beaulieu
(74) *Attorney, Agent, or Firm*—Brinks Hofer Gilson & Lione

(57) ABSTRACT

An information distribution center constantly obtains the latest traffic information from a traffic information center. A user registers one or more routes at the information distribution center in advance. A navigation apparatus accesses the information distribution center using a mobile communication device to request distribution of traffic information relating to a route registered at the information distribution center. In response to the request from the navigation apparatus, the information distribution center sends traffic information relating to the relevant route to the navigation apparatus.

15 Claims, 9 Drawing Sheets

FIG. 6

A route with the same starting point and destination
has been registered at the information distribution center.
Do you wish to obtain the latest traffic information from
the information distribution center?

YES    NO

FIG. 9

Registered Route: A

Traveling Distance: $d_A$ km

Estimated Time of Arrival: $h_A$:$m_A$

Registered Route: B

Traveling Distance: $d_B$ km

Estimated Time of Arrival: $h_B$:$m_B$

TRAFFIC-INFORMATION DISTRIBUTION METHOD ON-VEHICLE NAVIGATION APPARATUS

BACKGROUND OF THE INVENTION

1. Field of the Invention

The present invention relates to traffic-information distribution methods and navigation apparatuses. More specifically, the present invention relates to a traffic-information distribution method for distributing traffic information from an information distribution center to a navigation apparatus mounted on a vehicle, and to an on-vehicle navigation apparatus for carrying out the traffic-information distribution method.

2. Description of the Related Art

A navigation apparatus used on a vehicle includes a map-data storage device such as a DVD (digital versatile disk), having map data recorded thereon, a display, and a vehicle-movement detector for detecting a current position and orientation of the vehicle, including a gyro, a GPS (Global Positioning System) receiver, and a velocity sensor. The navigation apparatus reads map data for an area including the current position of the vehicle from the map-data storage device, draws a map image of an area around the current position of the vehicle based on the map data and superimposes a vehicle-position mark (location) on the map image. Furthermore, in accordance with movement of the vehicle, the navigation apparatus scrolls the map image, or moves the vehicle-position mark with the map image remaining fixed on the screen, allowing a user to recognize where the vehicle is currently traveling.

An on-vehicle navigation apparatus is usually capable of route navigation, allowing a user to readily travel to a desired destination. Route navigation is executed in the following manner. A route that links a starting point and a destination with the lowest cost is automatically found based on map data, by a simulation based on the breadth-first search or Dijkstra algorithm. The route that has been found is stored as a navigation route. While the vehicle is traveling, the navigation route is shown on the map screen as distinguished from other roads by color and width. Furthermore, when the vehicle is within a predetermined distance from an intersection where the vehicle should change its direction on the navigation route, an arrow indicating a direction to be taken is shown at the intersection on the map image. In this manner, the user is navigated to the destination.

A cost refers to a value representing the appropriateness as a navigation route, such as a value calculated by multiplying a distance with a constant in accordance with road widths, road types (e.g., ordinary road or highway), right and left turns, etc., or an estimated traveling time of the vehicle. Even if two routes have the same distance, cost may differ depending on whether the user prefers to use a toll road, whether the user places priority on distance or time, etc.

Maps stored in the map-data storage device, such as a DVD, are divided into areas by appropriate longitudinal and latitudinal intervals in accordance with a reduction scale such as 1/12,500, 1/25,000, 1/50,000, or 1/100,000. In the map data, roads and the like are stored each as a group of coordinate values of nodes represented by longitude and latitude. A road consists of a series of two or more nodes, and a path that connects two nodes is called a link. The map data includes (1) a road layer including a list of roads, a node table, and a list of nodes forming intersections; (2) a background layer for showing roads, buildings, parks, rivers, and the like on the map image; and (3) a text/symbol layer for showing text including names of administrative regions, such as city names, town names, and village names, names of roads, names of intersections, and names of buildings, and for showing map symbols and the like.

Recently, systems for providing traffic information from outside vehicles, such as VICS (Vehicle Information and Communication System), have come into practical use. In VICS, various traffic information, such as accident information, congestion information, and parking-vacancy information, is provided using optical beacons, radio beacons, and FM multiplex broadcasting. An on-vehicle navigation apparatus receives the traffic information by a beacon receiver or an FM-multiplex-broadcast receiver, and displays the traffic information on a display. For example, upon receiving traffic information, the navigation apparatus shows a red arrow along a relevant road, indicating congestion, in a map image on the display.

Furthermore, some navigation apparatuses are capable of dynamic route guidance (DRG), i.e., capable of automatically searching for a route for detouring congestion based on congestion information of VICS. This allows a vehicle to travel to a destination while detouring congested roads by following navigation provided by such a navigation apparatus.

However, optical beacons or radio beacons cannot be received without visiting locations where the beacons are provided. As for VICS information provided by FM multiplex broadcasting, reception is allowed within a service area of FM broadcasting. However, since information is updated every five minutes, it usually takes a time on the order of ten minutes for the user to receive VICS information after an FM-multiplex-broadcast receiver starts operation. Thus, generally, a navigation route is searched for without paying consideration to VICS information, and the vehicle starts traveling along the navigation route.

If the navigation apparatus is capable of DRG, the navigation apparatus checks congestion and the like on the navigation route upon obtaining VICS information while the vehicle is traveling, and searches for a detour route if congestion on the navigation route is observed. However, since the vehicle travels some distance before the navigation apparatus obtains VICS information, in some cases, a branch point is passed before VICS information is obtained, thereby failing to avoid the congestion in time.

SUMMARY OF THE INVENTION

Accordingly, it is an object of the present invention to provide a traffic-information distribution method for quickly distributing traffic information relating to a route to be taken, and to an on-vehicle navigation apparatus for carrying out the traffic-information distribution method.

The present invention, in one aspect thereof, provides a traffic-information distribution method for distributing traffic information from an information distribution center to a navigation apparatus mounted on a vehicle, the traffic-information distribution method including the acts of allowing a user of the navigation apparatus to register one or more routes at the information distribution center; allowing the navigation apparatus to access the information distribution center using a communication device to request distribution of traffic information relating to the one or more routes registered at the information distribution center; and allowing the information distribution center to send traffic information relating to the one or more routes to the navigation apparatus in response to the request from the navigation apparatus.

According to the present invention, the information distribution center constantly obtains the latest traffic information of a large range of areas. The user registers one or more routes at the information distribution center in advance. The navigation apparatus accesses the information distribution center, using the communication device, to request distribution of a route registered at the information distribution center. Since the route has already been registered at the information distribution center, the navigation apparatus is not required to send a node sequence of the route to the information distribution center, serving to reduce communication time. In response to the request from the navigation apparatus, the information distribution center sends traffic information relating to the specified route to the navigation apparatus. Also at this time, since it suffices to send traffic information for a limited area, communication time is reduced.

Thus, according to the present invention, traffic information relating to a route registered in advance at the information distribution center can be quickly obtained from the information distribution center using the communication device. Accordingly, the latest information relating to a route to be taken can be obtained before the vehicle starts traveling. This allows the selection of an appropriate route to the destination.

The present invention, in another aspect thereof, provides an on-vehicle navigation apparatus used on a vehicle to obtain traffic information from an information distribution center external to the vehicle, the on-vehicle navigation apparatus including a map-data storage unit for storing map data; a vehicle-position detection unit for detecting a current position of the vehicle; a route storage means for storing one or more routes; a registration unit for registering a desired route among the one or more routes stored in the route storage unit at the information distribution center using a mobile communication device; and a control unit for checking the route storage unit, when a starting point and a destination are set, to determine whether a route with the same starting point and destination has been registered at the information distribution center, and, when it is determined that a relevant route has been registered at the information distribution center, requesting the information distribution center, using the mobile communication device, to distribute traffic information relating to the relevant route.

The on-vehicle navigation apparatus forms a link with the information distribution center using a mobile communication device. A route specified by the user among the one or more routes stored in the route storage unit is registered at the information distribution center. Data as to which routes have been registered at the information distribution center is stored in the route storage unit.

When a starting point and a destination are set by the user, the control unit checks the route storage unit to determine whether a route with the same starting point and destination has been registered at the information distribution center. If such a route has been registered, the control unit accesses the information distribution center, using the mobile communication device, to request traffic information relating to the relevant route.

Accordingly, the latest information of a route to be taken can be obtained before the vehicle starts traveling.

As described above, according to the present invention, one or more routes are registered at an information distribution center in advance. A navigation apparatus accesses the information distribution center using a mobile communication device to request distribution of traffic information relating to a route registered at the information distribution center. In response to the request from the navigation apparatus, the information distribution center sends the traffic information of the relevant route to the navigation apparatus. Thus, a user is allowed to quickly obtain traffic information of a route to be taken, and to select an appropriate route to a destination.

BRIEF DESCRIPTION OF THE DRAWINGS

FIG. 6 is an illustration of an example screen that is displayed when a starting point and a destination are set and a route with the same starting point and destination has been registered at the information distribution center;

FIG. 9 is an illustration of an example screen showing an estimated time of arrival and a traveling distance for each route, obtained from the information distribution center.

DESCRIPTION OF THE PREFERRED EMBODIMENTS

Now, an embodiment of the present invention will be described with reference to the accompanying drawings.

Figure 1:
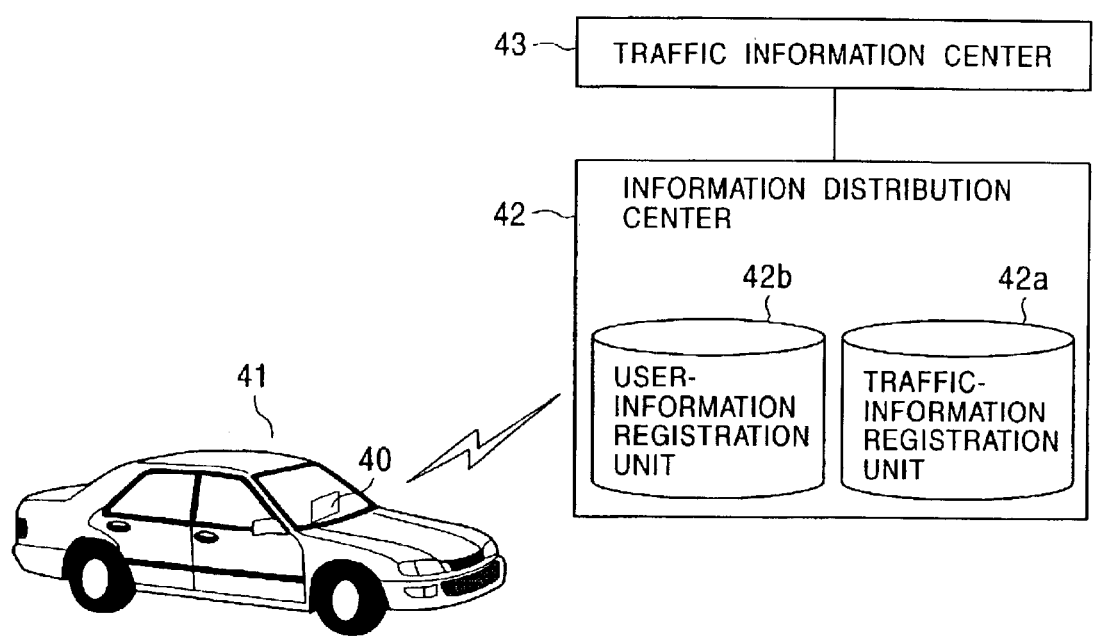
FIG. 1 is a schematic diagram showing an overview of a traffic-information distribution method according to an embodiment of the present invention.

FIG. 1 is a schematic diagram showing an overview of a traffic-information distribution method according to an embodiment of the present invention. Referring to FIG. 1, a traffic information center 43 collects traffic information (regarding congestion, regulation, etc.) of various areas in real time, and processes and compiles the traffic information into a predetermined format. An information distribution center 42 obtains the latest traffic information compiled at the traffic information center, and records the traffic information in a traffic-information registration unit 42a. Furthermore, in the information distribution center 42, a user-information registration unit 42b for keeping records of data associated with each user is provided. In order to use the information distribution center 42, each user is required to register in advance an ID unique to the user, and one or more routes (node sequences) for which the user wishes to receive information, at the information distribution center 42. A route registered at the information distribution center 42 will hereinafter be referred to as a registered route.

A navigation apparatus 40 mounted on a vehicle 41 accesses the information distribution center 42 using a mobile communication device, such as an on-vehicle phone, to obtain traffic information relating to a registered route from the information distribution center 42.

Figure 2:
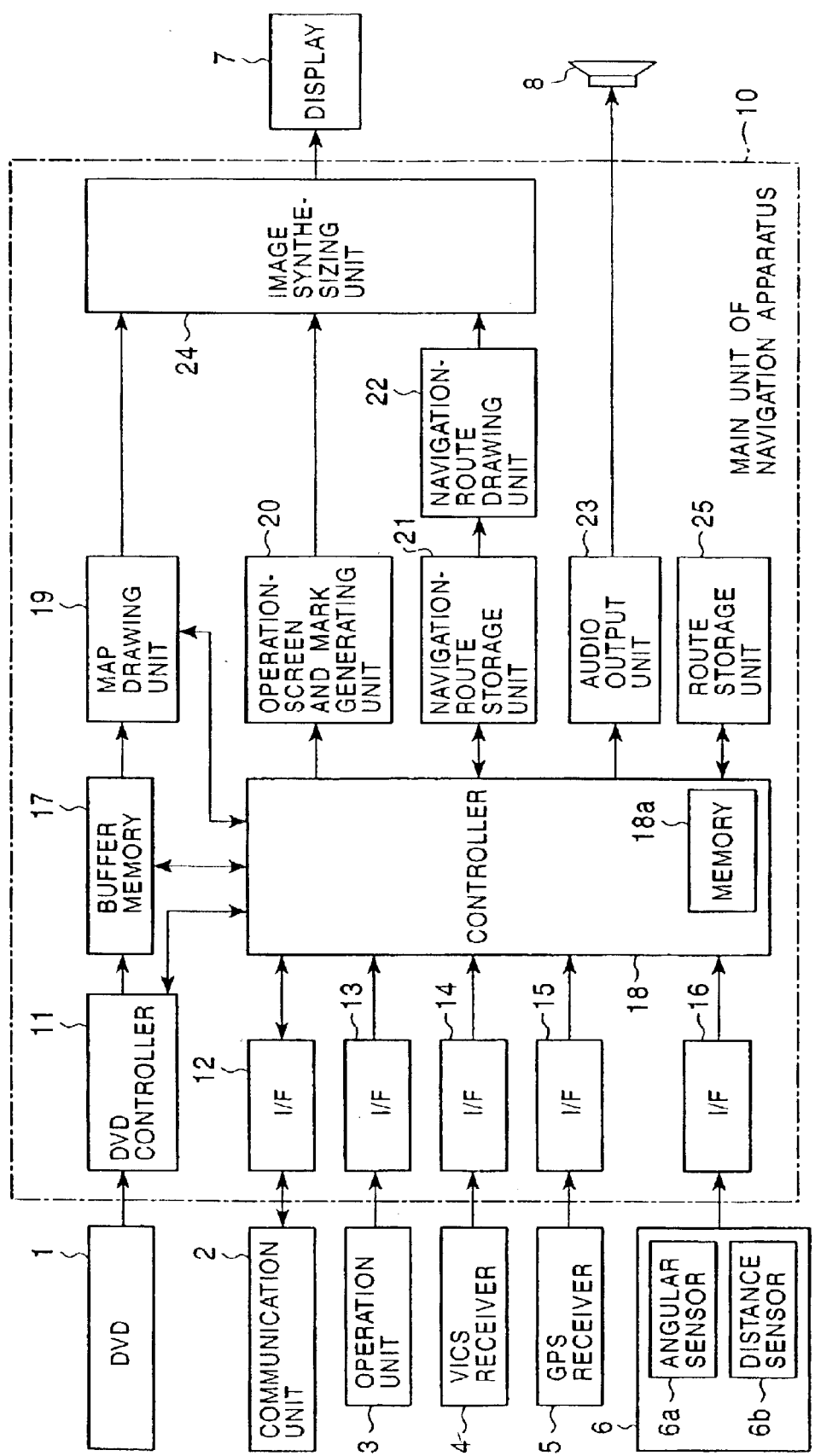
FIG. 2 is a block diagram showing the construction of an on-vehicle navigation apparatus according to the embodiment.

FIG. 2 is a block diagram showing the construction of the on-vehicle navigation apparatus 40 in this embodiment.

Referring to FIG. 2, a DVD 1 stores map data and the like. A mobile communication device 2 is used for communication with the information distribution center 42. In this embodiment, an on-vehicle phone is used as the mobile communication device 2. An operation unit 3 has various buttons and the like for operating a main unit 10 of the navigation apparatus, which will be described later. The operation unit 3 includes a remote-control transmitter and a remote-control receiver, and the user is allowed to operate the main unit 10 of the navigation apparatus using the remote-control transmitter at hand.

Figure 3:
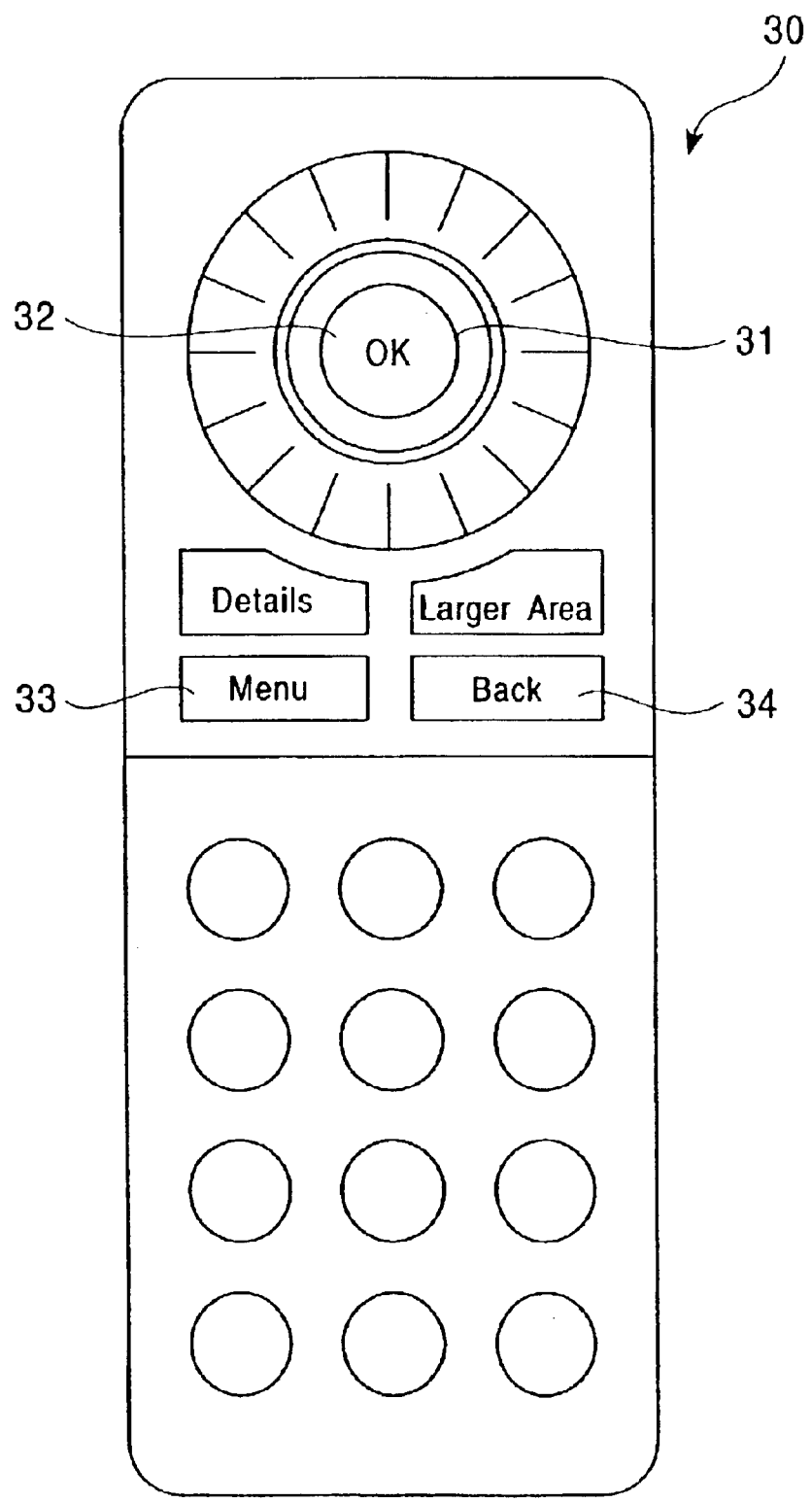
FIG. 3 is a plan view showing an example of a remote-control transmitter.

FIG. 3 is a plan view showing an example of the remote-control transmitter. Referring to FIG. 3, a remote control transmitter 30 has a joystick 31, an "OK" button 32, and various buttons including a "Menu" button 33 and a "Back" button 34. The joystick 31 and operation buttons 32 to 34 have functions in accordance with operation modes.

Returning to FIG. 2, a VICS receiver 4 receives VICS information transmitted by optical beacons, radio beacons, and FM multiplex broadcasting. A GPS receiver 5 receives GPS signals transmitted from GPS satellites to detect the longitude and latitude of a current position of the vehicle.

A self-contained-navigation sensor 6 includes an angular sensor 6a for detecting an angle of rotation, such as a gyro, and a traveling-distance sensor 6b that generates a pulse at a cycle of a predetermined traveling distance. A display 7 is, for example, a liquid crystal display panel. The main unit 10 of the navigation apparatus displays a map of an area around a current position of the vehicle, a navigation route from a starting point to a destination, a vehicle-position mark, and other navigation information on the display 7. A speaker 8 provides navigation information to the user by audio output.

The main unit 10 of the navigation apparatus includes the following components. A DVD controller 11 reads data from the DVD 1. An interface 12 is connected to the mobile communication device 2. An interface 13 is connected to the operation unit 3. An interface 14 is connected to the VICS receiver 4. An interface 15 is connected to the GPS receiver 5. An interface 16 is connected to the self-contained-navigation sensor 6.

A buffer memory 17 temporarily stores map data and the like read from the DVD 1. A controller 18 is implemented by a microcomputer. The controller 18 exchanges data with the information distribution center 42 using the mobile communication device 2. Furthermore, the controller 18 executes various processes; for example, it detects a current position of the vehicle based on information received from the interfaces 15 and 16, reads particular map data out of the DVD 1 into the buffer memory 17 through the DVD controller 11, and searches for a navigation route from a starting point to a destination in accordance with search conditions, using the map data read into the buffer memory 17. The controller 18 includes a memory 18a for storing an ID unique to the user.

A map drawing unit 19 generates a map image based on the map data in the buffer memory 17. An operation-screen and mark generating unit 20 generates various menu screens (operation screens) in accordance with operation status, and various marks including a vehicle-position mark and a cursor.

A navigation-route storage unit 21 stores a navigation route found by the controller 18. A navigation-route drawing unit 22 draws the navigation route. The navigation-route storage unit 21 stores all the nodes from a starting point to a destination along the navigation route found by the controller 18. The navigation-route drawing unit 22 reads navigation-route information (node sequence) from the navigation-route storage unit 21, and draws the navigation route as distinguished from other roads by color and width.

An audio output unit 23 supplies an audio signal to the speaker 8 based on a signal from the controller 18.

An image synthesizing unit 24 superimposes various marks and operation screens generated by the operation-screen and mark generating unit 20, the navigation route drawn by the navigation-route drawing unit 22, etc. on the map image drawn by the map drawing unit 19 on the display 7.

A route storage unit 25 stores, for example, routes that the user has used in the past.

In the navigation apparatus described above, the controller 18 detects a current position of the vehicle based on GPS signals received by the GPS receiver 5 and signals supplied by the self-contained-navigation sensor 6. The controller 18 then reads map data of an area around the current position of the vehicle from the DVD 1 through the DVD controller 11, and stores the map data in the buffer memory 17. The map drawing unit 19 generates a map image based on the map data in the buffer memory 17, and displays the map image of the area around the current position of the vehicle on the display 7.

Furthermore, the controller 18 detects a current position of the vehicle in accordance with the movement thereof, based on signals supplied by the GPS receiver 5 and the self-contained-navigation sensor 6. In accordance with the result of the detection, the controller 18 superimposes a vehicle-position mark on the map image displayed on the display 7, and moves the vehicle-position mark or scrolls the map image in accordance with movement of the vehicle.

Furthermore, when the user sets a destination by operating the operation unit 3, the controller 18 searches for a route to the destination with the lowest cost, with the current position of the vehicle as a starting point, using the map data stored in the DVD 1. The controller 18 then stores the route found by the search in the route storage unit 21 as a navigation route, and superimposes the navigation route on the displayed map image. The controller 18 generates navigation information as required in accordance with the movement of the vehicle, thereby directing the vehicle to travel along the navigation route to the destination.

A method of allowing the navigation apparatus 40 to register a route at the information distribution center 42 will now be described.

In the on-vehicle navigation apparatus 40 in this embodiment, with regard to a route that has been traveled, having a destination set by the user, the controller 18 stores a sequence of nodes from a starting point to the destination in the route storage unit 25. The route storage unit 25 also allows storage of a route that has been set based on, for example, a starting point, a destination, and an intermediate point specified by the user on the map image displayed on the display 7. The route storage unit 25 also allows storage of a navigation route found by the navigation apparatus 40. The routes stored in the route storage unit 25 can be displayed on the display 7 by a predetermined operation.

Figure 4:
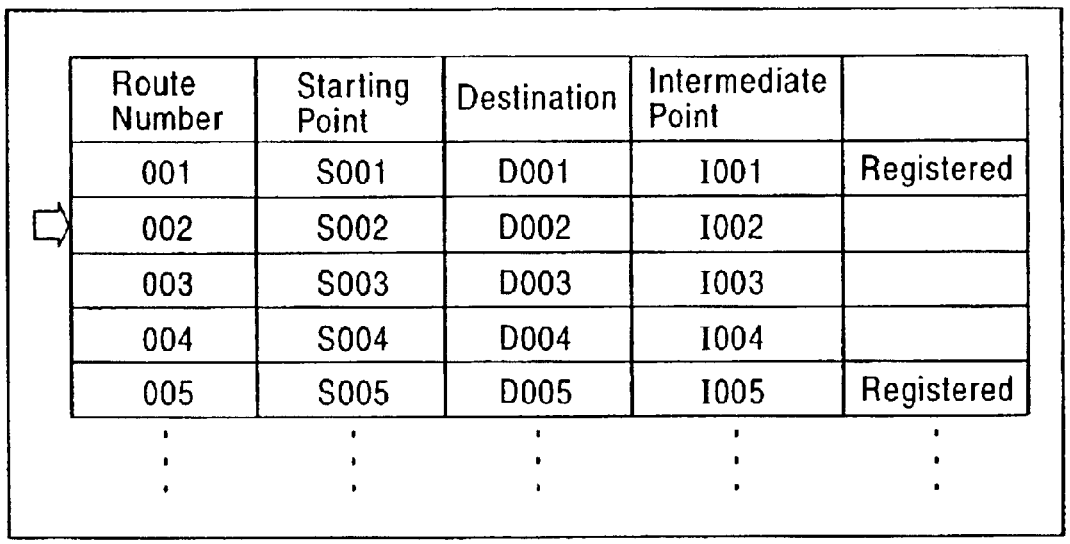
FIG. 4 is an illustration of an example screen on a display, showing routes stored in a route storage unit.

FIG. 4 shows an example screen in which routes stored in the route storage unit 25 are displayed on the display 7. As shown in FIG. 4, the screen shows a unique route number automatically assigned to each route by the controller 18, a starting point, a destination, and an intermediate point. The user is allowed to set an arbitrary name for each route instead of the route number.

When the joystick 31 is moved up or down while the screen is displayed, a pointer (shown as an arrow) is moved up or down accordingly. When the pointer is moved to a desired route and the "OK" button 32 of the remote-control transmitter 30 is pressed, a screen as shown in FIG. 5 is displayed.

Figure 5:
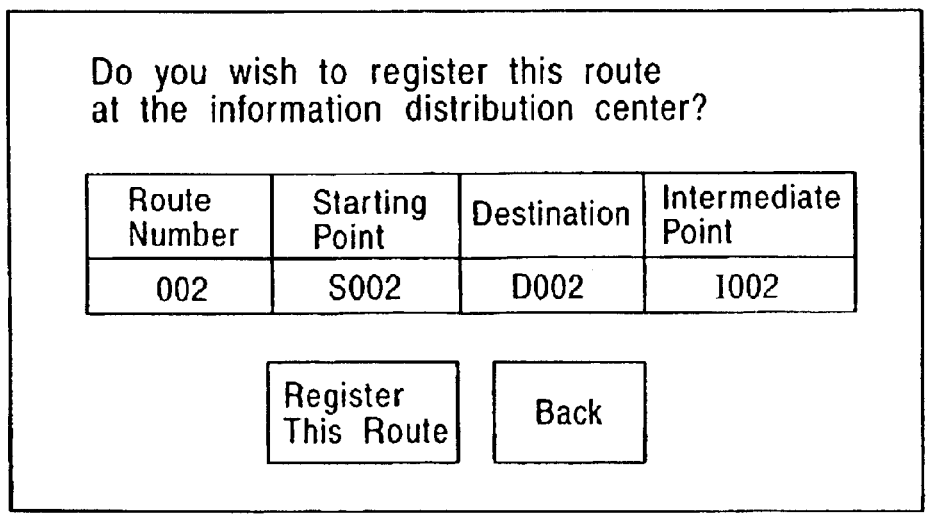
FIG. 5 is an illustration of an example screen that is displayed when a route stored in the route storage unit is registered at an information distribution center.

While the screen shown in FIG. 5 is displayed, when "Register This Route" is selected by operating the joystick 31 and the "OK" button 32 is pressed, information relating to the selected route (route number and node sequence) is sent to the information distribution center 42 together with the user ID.

The information distribution center 42 identifies the user on the basis of the ID, and registers the information relating to the route in the user-information registration unit 42b. In this manner, information relating to a route selected by the user can be registered at the information distribution center 42. Of the routes stored in the route storage unit 25, for routes that have been registered, data indicating that fact is added.

In the screen shown in FIG. 5, when "Back" is selected by the joystick 31 and the "OK" button 32 is pressed, or when the "Back" button 34 of the remote-control transmitter 30 is directly pressed, the screen shown in FIG. 4 is displayed again. Routes marked as "Registered" in FIG. 4 are routes that already have been registered at the information distribution center 42. When the "Back" button 34 of the remote-control transmitter 30 is pressed while the screen shown in FIG. 4 is displayed, a screen for normal operation, showing a map image of an area around the current position of the vehicle, is displayed again.

An operation for receiving a traffic-information distribution service from the information distribution center 42 will now be described.

Figure 7:
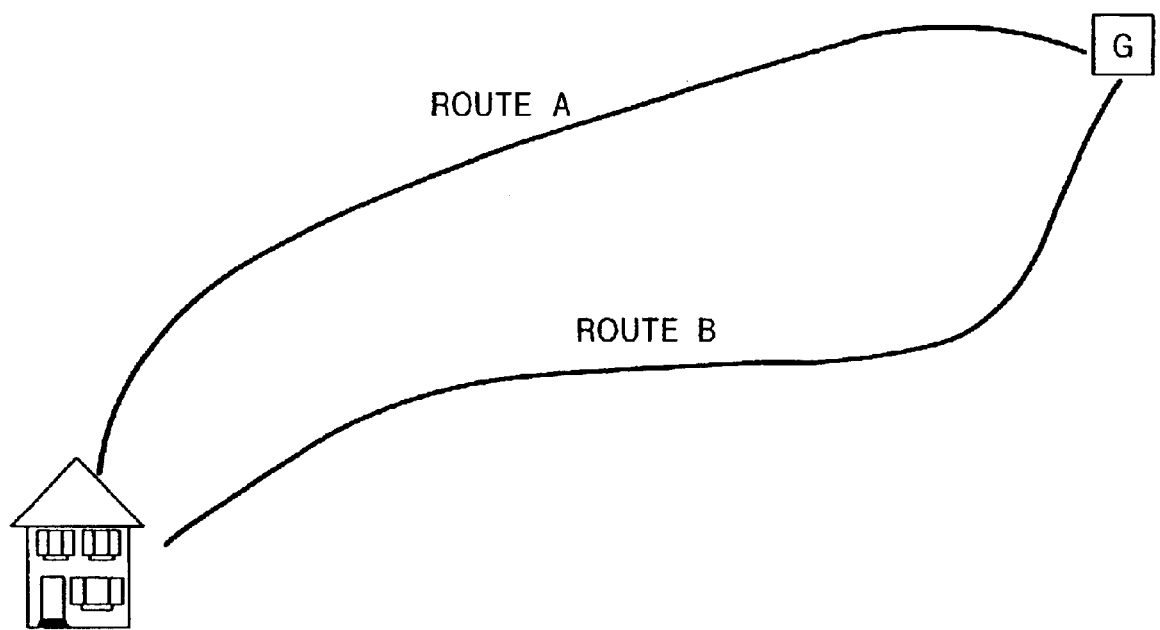
FIG. 7 is a schematic diagram showing two routes with the same starting point and destination.

When a starting point and a destination are set by the user, the controller 18 of the navigation apparatus 40 checks the route storage unit 25 to determine whether a route with the same starting point and destination has been registered at the information distribution center 42. If it is determined that a route with the same starting point and destination has been registered at the information distribution center 42, a message that reads, for example, "A route with the same starting point and destination has been registered at the information distribution center. Do you wish to obtain the latest traffic information from the information distribution center?" is displayed on the display 7, as shown in FIG. 6. As shown in the schematic diagram in FIG. 7, in this example it is assumed that two routes A and B with the same starting point and destination but with different intermediate points have been registered at the information distribution center 42.

While the screen shown in FIG. 6 is displayed, when the user operates the remote-control transmitter 30 to select "YES" and then presses the "OK" button 32, the controller 18 establishes a communication link with the information distribution center 42 using the mobile communication device 2. The controller 18 then reads the user ID from the memory 18a, and transmits the user ID to the information distribution center 42.

The information distribution center 42 permits access if the user ID transmitted from the navigation apparatus 40 over the communication link has been registered in advance, while otherwise terminating the link. Let it be assumed herein that the ID has already been registered at the information distribution center 42 and that access is permitted accordingly.

Then, the navigation apparatus 40 sends data for identifying a registered route (the route number in this example) to the information distribution center 42. In this example, since a node sequence of the relevant route has already been registered at the information distribution center 42, it suffices for the navigation apparatus 40 to send only the data identifying the route. Thus, communication is completed in a very short period of time.

Figure 8:
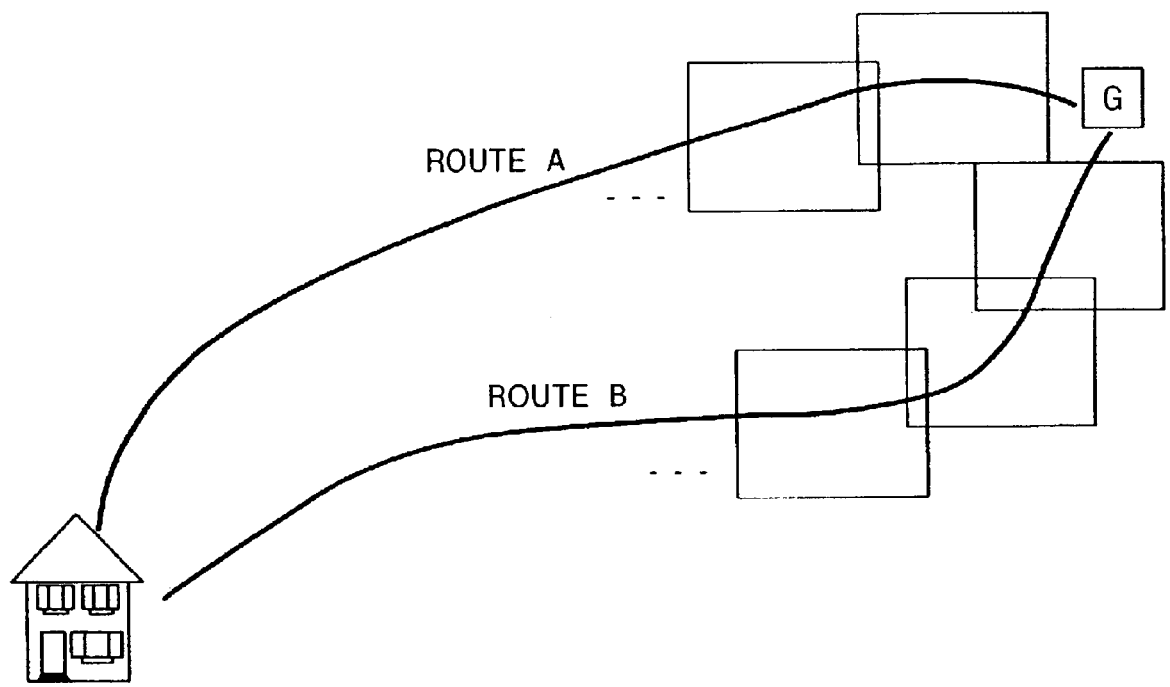
FIG. 8 is a schematic diagram showing a process of extracting information relating to a registered route at the information distribution center.

At the information distribution center 42, the relevant registered route is identified based on the user ID and the route number transmitted from the navigation apparatus 40. Furthermore, data relating to the relevant route is extracted from the latest traffic information stored in the traffic-information registration unit 42a, as shown in the schematic diagram in FIG. 8, and the extracted data is sent to the navigation apparatus 40. Furthermore, at the information distribution center 42, a traveling distance from the starting point to the destination along the relevant route and an estimated time of arrival are calculated using the traffic information stored in the traffic information registration unit 42a, and the results are sent to the navigation apparatus 40.

Figure 10:
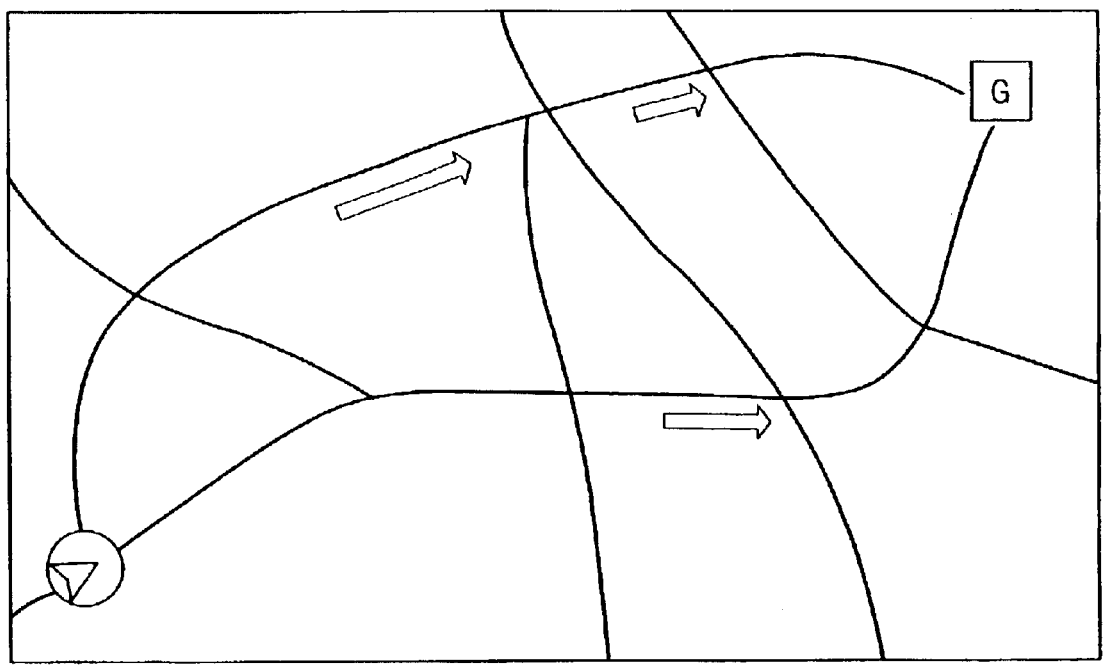
FIG. 10 is an illustration of an example screen showing arrows indicating congestion on a map image based on traffic information obtained from the information distribution center.

The controller 18 of the navigation apparatus 40 stores the information transmitted from the information distribution center 42 and, for example, as shown in FIG. 9, displays the estimated time of arrival and the traveling distance for each route. When the user selects a desired route on the screen, the controller 18 sets the selected route as a navigation route. Then, the controller 18 generates navigation information as required in accordance with the movement of the vehicle 41 so that the vehicle 41 will be allowed to travel along the navigation route. For example, as shown in FIG. 10, congestion information may be indicated by an arrow on the map image on the display 7.

According to this embodiment, the latest traffic information regarding a route to be taken can be quickly obtained from the information distribution center 42. Thus, a user can set a route without congestion or other problems as a navigation route in the navigation apparatus 40. Furthermore, since an estimated time of arrival at a destination can be calculated at the information distribution center 42 based on the latest, detailed traffic information, the user can receive a relatively accurate time of arrival at the destination. Furthermore, according to this embodiment, the congestion status of a route that the user often uses can be readily known by a simple operation.

Even while the vehicle is traveling along the navigation route that has been set based on the traffic information obtained from the information distribution center 42, if congestion on the navigation route is detected based on VICS information, it is desired that the navigation apparatus find a route for detouring around the congestion based on the VICS information received and navigate the vehicle to the detour route.

Furthermore, although an estimated time of arrival for each registered route is calculated at the information distribution center 42 and transmitted to the navigation apparatus 40 in the embodiment described above, alternatively, the method may be such that traffic information relating to a route, requested by the navigation apparatus 40, is extracted from the traffic information registration unit 42a and transmitted to the navigation apparatus 40.

Furthermore, although the traffic information center 43 that collects traffic information and the information distribution center 42 that distributes traffic information to vehicles by mobile communications are separate in the embodiment described above, the arrangement may be such that an information distribution center is integrated into a traffic information center.

Furthermore, although map data is stored in a DVD in the embodiment described above, map data may be stored in a hard disk (magnetic storage device). In that case, the route storage unit 25 may be provided in the hard disk.

What is claimed is:

1. A traffic-information distribution method for distributing traffic information from an information distribution center to a navigation apparatus mounted in a vehicle, the traffic-information distribution method comprising:

allowing a user of the navigation apparatus to register one or more routes at the information distribution center, where the navigation routes registered at the information distribution center are routes that are searched for and found by the navigation apparatus on the vehicle;

allowing the navigation apparatus to access the information distribution center using a communication link to request distribution of traffic information relating to one or more routes registered at the information distribution center; and allowing the information distribution center to send traffic information relating to the one or more routes to the navigation apparatus in response to the request from the navigation apparatus, where the traffic information sent by the information distribution center does not include a navigation route calculated by the information distribution center.

2. A traffic-information distribution method according to claim 1, wherein, when a starting point and a destination are set, the navigation apparatus checks whether a route with the same starting point and destination has been registered at the information distribution center, and requests the information distribution center to distribute traffic information relating to the relevant route when a route with the same starting point and destination has been registered.

3. A traffic-information distribution method according to claim, 1, wherein the traffic information includes at least one of congestion data and traffic-regulation data.

4. A traffic-information distribution method according to claim 1, wherein each of the one or more routes is a route that is set by the user by specifying a destination and an intermediate point.

5. A traffic-information distribution method according to claim 1, wherein the navigation apparatus registers a route ID for identifying each of the one or more routes, together with the one or more routes, at the information distribution center.

6. A traffic-information distribution method according to claim 1, wherein the navigation apparatus registers a user ID for identifying the user, together with the one or more routes, at the information distribution center.

7. A traffic-information distribution method according to claim 1, wherein the navigation apparatus specifies a route ID and sends the route ID to the information distribution center, and receives traffic information relating to a route associated with the specified route ID from the information distribution center.

8. A traffic-information distribution method according to claim 1, wherein the navigation apparatus receives and displays data regarding an estimated time of arrival for a specified route, and the estimated time of arrival is calculated using traffic information.

9. A traffic-information distribution method according to claim 1, wherein the information distribution center allows registration of more than one route with the same starting point and destination.

10. A traffic-information distribution method according to claim 1, wherein the information distribution center extracts traffic information relating to a specified route and sends the traffic information to the navigation apparatus.

11. A traffic-information distribution method according to claim 1, wherein the information distribution center calculates, using traffic information, an estimated time of arrival at a destination of a specified route, and sends the estimated time of arrival to the navigation apparatus.

12. A traffic-information distribution method according to claim 1, wherein the information distribution center permits access when a user ID transmitted from the navigation apparatus has been registered in advance white not permitting access when the user ID has not been registered.

13. A traffic-information distribution method according to claim 1, wherein the information distribution center identifies a registered route based on a user ID and a route ID transmitted from the navigation apparatus.

14. An on-vehicle navigation apparatus used in a vehicle to obtain traffic information from an information distribution center external to the vehicle, the on-vehicle navigation apparatus comprising:

map-data storage means for storing map data;

vehicle-position detection means for detecting a current position of the vehicle;

route storage means for storing one or more routes;

registration means for registering a desired route among the one or more routes stored in the route storage means at the information distribution center using mobile communication means, where the routes registered at the information distribution center are routes that are searched for and found by the navigation apparatus on the vehicle; and control means for checking the route storage means, when a starting point and a destination are set, to determine whether a route with the same starting point and destination has been registered at the information distribution center, and, when it is determined that the route has been registered at the information distribution center, requesting the information distribution center, using the mobile communication means, to distribute traffic information relating to the route, where the traffic information sent by the information distribution center does not include a route calculated by the information distribution center.

15. An on-vehicle navigation apparatus according to claim 14, wherein the mobile communication means is a phone installed in the vehicle.

* * * * *